Feb. 28, 1956 T. J. AULT 2,736,602
CARGO CONTAINER LOCKING STRUCTURE
Filed July 13, 1953 2 Sheets-Sheet 1
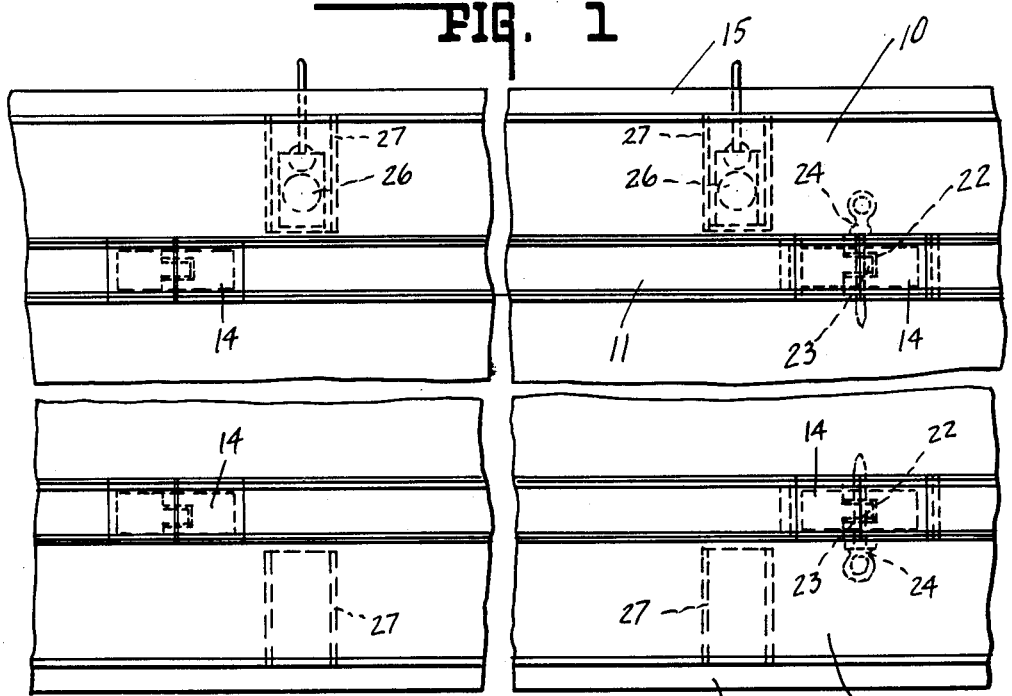
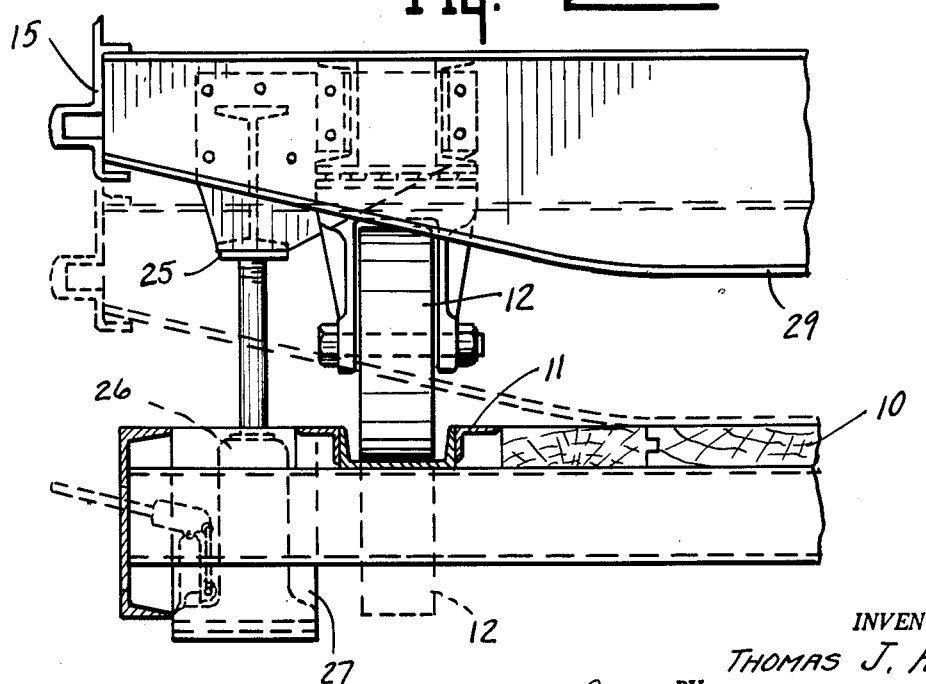
INVENTOR.
THOMAS J. AULT.
BY
Lockwood, Galt, Woodard & Smith
ATTORNEYS.

Feb. 28, 1956 T. J. AULT 2,736,602
CARGO CONTAINER LOCKING STRUCTURE
Filed July 13, 1953 2 Sheets-Sheet 2
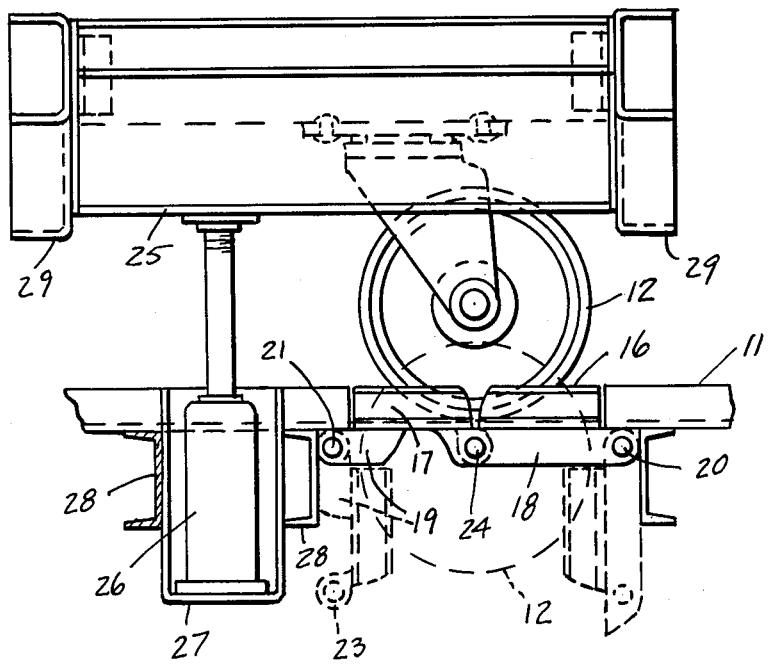
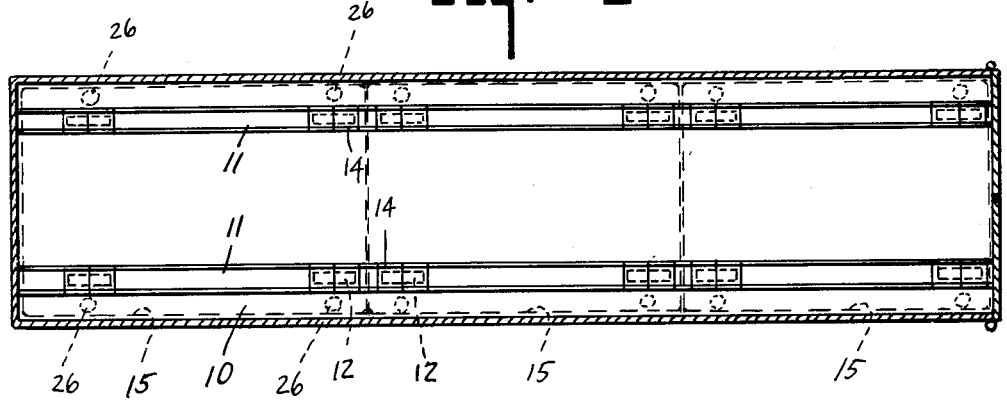
INVENTOR.
THOMAS J. AULT.
BY
Lockwood, Galt, Woodard & Smith,
ATTORNEYS.

United States Patent Office 2,736,602
Patented Feb. 28, 1956

2,736,602

CARGO CONTAINER LOCKING STRUCTURE

Thomas J. Ault, Selma, Ind.

Application July 13, 1953, Serial No. 367,551

6 Claims. (Cl. 296—35)

This invention relates generally to cargo transportation apparatus, and more particularly to cargo transportion apparatus consisting of truck or trailer structure adapted to receive unit containers and including apparatus for locking such containers to the truck or trailer structure.

The principal object of this invention is to provide, in transportion apparatus consisting of a truck or trailer body and a plurality of cargo containers, locking apparatus adapted to lock each container with respect to the truck or trailer structure.

In accordance with this invention there is provided transportion apparatus comprising a truck or trailer body having tracks for receiving the casters of cargo containers, the tracks being provided with collapsible sections adapted to permit lowering of a container in such a way that the caster is lowered through the collapsible track sections, thereby to lock the container with respect to the truck or trailer body.

The full nature of the invention will be understood from the accompanying drawings and the following description and claims:

Fig. 1 is an enlarged fragmentary top plan view of a truck or trailer body having a track constructed in accordance with this invention.

Fig. 2 is a fragmentary end view showing the caster of a cargo container in rolling relationship with a track of a truck or trailer body.

Fig. 3 is a fragmentary side view of the structure illustrated in Fig. 2.

Fig. 4 is a top plan view of a truck or trailer body including the invention.

Referring to the drawings, this invention comprises a vehicle body or bed 10 of conventional construction except that it includes a pair of parallel tracks 11 extending longitudinally of and embeded in the bed 10. As illustrated in Fig. 4, as many as three cargo containers may be rolled onto the tracks 11, the casters 12 of which may be arranged to rest on collapsible or drop hinged sections 14 of tracks 11.

Figs. 2 and 3 illustrate the casters 12 of a cargo container 15 resting on the track 11 and more particularly on the drop hinged sections 14 thereof. The structure of the cargo container forms no part of this invention and, hence, is not described in any detail. The collapsible sections 14 each comprises drop hinge members 16 and 17 having the form of a channel and including lugs 18 and 19, respectively, which may be pinned to the vehicle bed by means of pins 20 and 21, respectively, these pins extending into suitable portions of the bed structure (not shown). For fastening the hinged sections 16 and 17 in a horizontal position the member 14, for example, may be slotted as at 22 to receive a tongue 23 of member 17. Members 16 and tongue 23 of member 17 may be bored to receive a locking pin 24 which serves the purpose of holding the members 16 and 17 in horizontal position so that containers may be rolled along the tracks 11.

After the containers have been positioned with the casters resting on the collapsible track sections 14, they may be lifted free of sections 14 by means of hydraulic jacks 26, there being, for example, four jacks distributed to lift each corner of each individual container. Jacks 26 may be mounted in box members 27 welded or otherwise fastened to structural members 28 of the bed 10.

When the particular container has been lifted sufficiently to free the casters 12 of the track sections 14, the pins 24 may be pulled, thereby to permit the hinged members 16 and 17 to drop to the dotted line position illustrated in Fig. 3. Subsequently, jacks 26 may be operated to lower the containers to the point where frame members 29 thereof rest on the body 10 with the casters 12 assuming the dotted line positions illustrated in Figs. 2 and 3. In this manner the containers are locked against any horizontal motion by means of the casters 12 extending downwardly below the tracks 11. Because of the load carried in the containers, it not necessary to provide any locking mechanism for preventing upward motion of the containers.

When it is desired to remove a container from the bed 10, the jacks 26 may be operated to lift the container to such an extent that the lower surfaces of the casters 12 are slightly above the level of track 11. The drop hinge members 16 and 17 may then be rotated to the point where the locking pin 24 may be inserted through the bores in member 16 and tongue 23. Pin 24 serves to hold the drop hinge sections 16 and 17 in closed position whereby jacks 26 may be operated to lower the container and therewith the casters 12 onto members 16 and 17. The container may then be rolled from the bed 10.

From the foregoing description it will be apparent that this invention provides a simple mechanism for locking a portable cargo container to the bed of a vehicle such as a truck or trailer. The locking apparatus is entirely a part of the bed of the vehicle, and the container itself requires no additional structure.

The invention claimed is:

1. A locking device for locking a portable container to a vehicle bed, the container having casters mounted adjacent its corners, comprising parallel tracks mounted on the bed of a vehicle, each of said tracks including spaced hinged sections, the spacing thereof corresponding with the spacing of said casters, said hinged sections being movable away from one another to form a gap in said tracks for receiving the casters of the container, one hinge section including a pair of spaced pin receiving members, the other hinge section comprising a pin receiving tongue movable into alignment between the spaced pin receiving members of said one section, a pin in said pin receiving members for locking said hinge sections together to close the gap in said track, and jacks mounted on said vehicle bed in spaced relation corresponding generally to the spacing of the corners of said container for lifting and lowering engagement with the container for moving the casters into and out of the gap formed by said hinge sections.

2. A locking device for locking a portable container to a vehicle bed, the container having casters mounted adjacent its corners, comprising parallel tracks mounted on the bed of a vehicle, each of said tracks including spaced hinged sections, the spacing thereof corresponding with the spacing of said casters, said hinged sections being movable away from one another to form a gap in said tracks beneath the casters of the container and including pin receiving members, a pin in said pin receiving members for locking said hinge sections together to close the gap in said track, and jacks mounted on said vehicle bed in spaced relation corresponding generally to the spacing of the corners of said container for lifting and lowering engagement with the container for moving the casters into and out of the gap formed by said hinge sections.

3. A locking device for locking a portable container to a vehicle bed, the container having casters mounted adjacent its corners, comprising parallel tracks mounted on the bed of a vehicle, each of said tracks including spaced hinged sections, the spacing thereof corresponding with the spacing of said casters, said hinged sections being movable away from one another to form a gap in said tracks beneath the casters of the container and including mutually cooperative members for locking said hinge sections together to close the gap in said track, and jacks mounted on said vehicle bed in spaced relation corresponding generally to the spacing of the corners of said container for lifting and lowering engagement with the container for moving the casters into and out of the gap formed by said hinge sections.

4. A locking device for locking a portable container having casters mounted adjacent its corners, comprising parallel tracks mounted on the bed of a vehicle, each of said tracks including spaced hinged sections, the spacing thereof corresponding with the spacing of said casters, said hinged sections being movable away from one another to form a gap in said tracks for receiving the casters of the container, one hinge section including a pair of spaced pin receiving members, the other hinge section comprising a pin receiving tongue movable into alignment between the spaced pin receiving members of said one section, and a pin in said pin receiving members for locking said hinge sections together to close the gap in said track.

5. A locking device for locking a portable container to a vehicle bed, the container having casters mounted adjacent its corners, comprising parallel tracks mounted on the bed of a vehicle, each of said tracks including spaced hinged sections, the spacing thereof corresponding with the spacing of said casters, said hinged sections being movable away from one another to form a gap in said tracks beneath the casters of the container and including pin receiving members, and a pin in said pin receiving members for locking said hinge sections together to close the gap in said track.

6. A locking device for locking a portable container to a vehicle bed, the container having casters mounted adjacent its corners, comprising parallel tracks mounted on the bed of a vehicle, each of said tracks including spaced hinged sections, the spacing thereof corresponding with the spacing of said casters, said hinged sections being movable away from one another to form a gap in said tracks beneath the casters of the container and including mutually cooperative members for locking said hinge sections together to close the gap in said track.

References Cited in the file of this patent
UNITED STATES PATENTS

| | | |
|---|---|---|
| 1,921,605 | Canfield | Aug. 8, 1933 |
| 2,117,067 | Ludington | May 10, 1938 |
| 2,585,126 | Holland | Feb. 12, 1952 |